Figures 1, 2, 3:
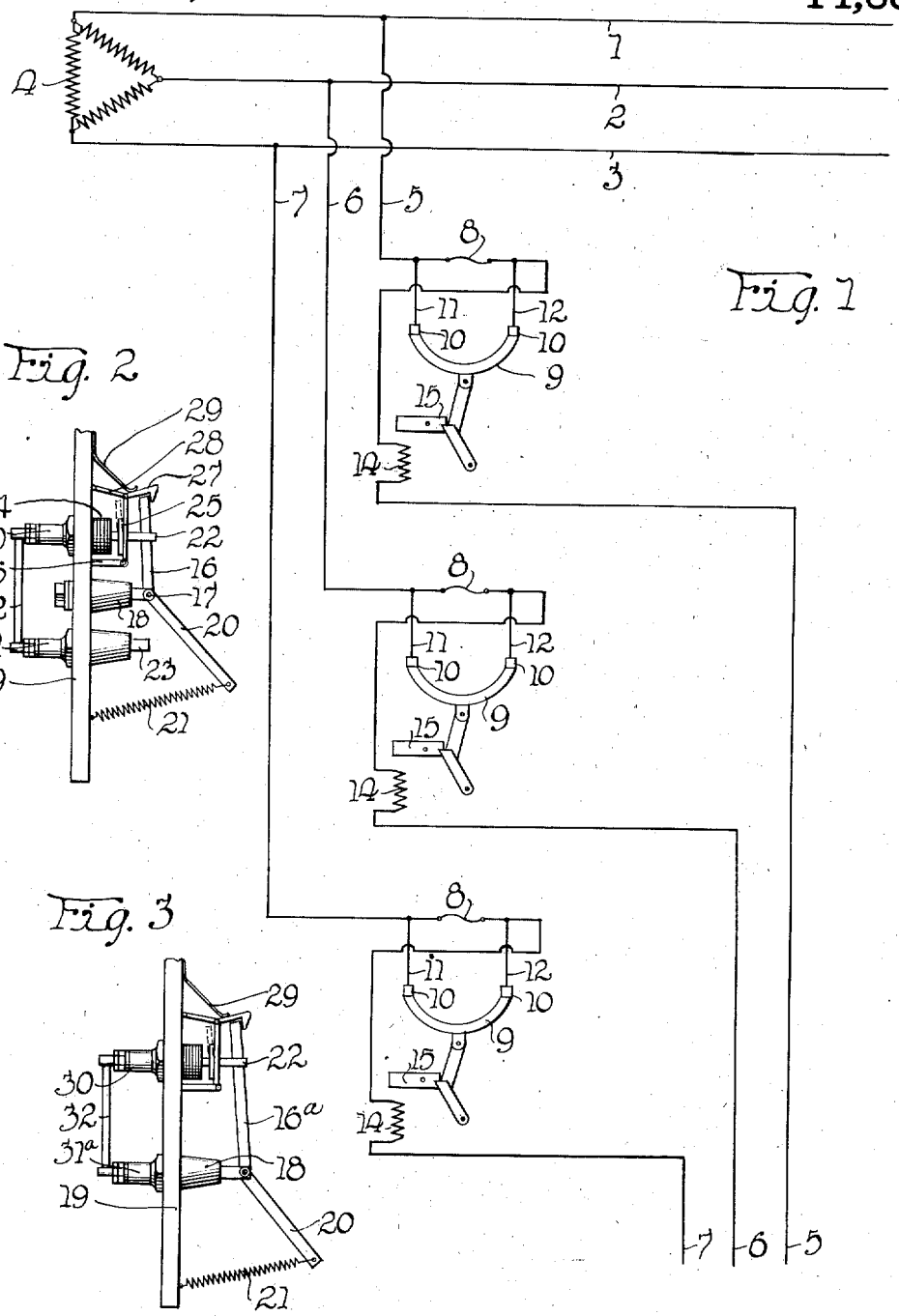

E. O. SCHWEITZER.

OVERLOAD CIRCUIT BREAKING APPARATUS

APPLICATION FILED OCT. 12, 1918.

Reissued June 8, 1920. 14,881.

Inventor
Edmund O. Schweitzer
By Brown Hanson & Gottcher
Attorneys

UNITED STATES PATENT OFFICE.

EDMUND O. SCHWEITZER, OF CHICAGO, ILLINOIS.

OVERLOAD CIRCUIT-BREAKING APPARATUS.

14,881. Specification of Reissued Letters Patent. Reissued June 8, 1920.

Original No. 1,211,967, dated January 9, 1917, Serial No. 768,577, filed May 19, 1913. Application for reissue filed October 12, 1918. Serial No. 257,907.

*To all whom it may concern:*

Be it known that I, EDMUND O. SCHWEITZER, a citizen of the United States, and resident of Chicago, in the county of Cook and State of Illinois, have invented a new and Improved Overload Circuit-Breaking Apparatus, of which the following is a full, clear, and exact description.

My invention relates to overload circuit breaking apparatus, and more particularly to means for interrupting current flow at high tension.

Prominent objects of the invention are to provide a simple, practical and efficient overload circuit breaking arrangement; to secure quickness and accuracy of operation, to minimize the arcing and destructive effect when the circuit is broken; to insure reliability and certainty of operation; and to secure the foregoing and other desirable results in a simple and expeditious manner.

The switching or interrupting of current flow on circuits operating on high tension is in general a difficult and dangerous matter. When a line bears a heavy flow of current at a high voltage, physical separation of the conductors is followed by an arc which tends to persist to a degree depending upon the resistance and inductance of the circuit, the capacity of the generating system back of it, and the voltage on the conductors.

In practice previous to my invention, the only feasible way to switch such current flow was by oil switches, but oil switches are very expensive in cost and upkeep and in large sizes are slow to operate. The use of air break switches for such service has been wholly unpracticable heretofore. The reason for this is that the arc which is formed destroys the switch contact. Particularly upon a shorted or overloaded line an air break switch is useless because when the blade is opened, the arc follows the full movement of the blade and continues even after the switch is fully opened. The result is the prompt destruction of the switch. This is readily understood when it is considered that on a short-circuited line substantially the entire capacity of the system is concentrated upon the production of heat, and as the break at the switch constitutes the major part of the resistance of the circuit, an enormous amount of heat may be liberated at the switch.

The provision of oil switches at various points on a line or system where it is desirable to have means for opening the circuit, is not feasible, because of first cost and further because of the inability to give them proper attention for maintenance. As a result, most lines are inadequately provided with circuit breakers.

The statements above made with respect to an air break switch also hold true of any type of switch, the voltage interrupting capacity of which is below that of the circuit upon which it is to be used, whether of air break switch, oil switch or any other type.

According to my invention I provide a switch which, of itself, is incapable of satisfactorily interrupting the flow of current at the voltage at which the line is operated and by means of a fuse of special character in shunt with the switch I am able to take from the switch the actual duty of interrupting the current flow and place it upon the fuse which fuse is of such character and construction as to be capable of interrupting the flow of current at the voltage to which the line is subjected.

In the preferred form of my invention I employ an air break switch of relatively inexpensive construction and of a character not suitable to interrupt a heavy flow of current of the particular voltage on the line, and place in shunt with this switch a fusible circuit breaking device of high voltage interrupting capacity but of small current carrying capacity.

In the accompanying drawings—

Figure 1 is a diagrammatic view of high tension three phase power or lighting circuit provided with overload circuit breaking apparatus embodying my invention; and Figs. 2 and 3 are views of the preferred and modified form of my apparatus, respectively.

In the drawings I have shown the line conductors 1, 2 and 3, representing the three high tension lines or conductors of a three-phase system supplied by dynamo or generator 4. The conductors 5, 6 and 7 are other line conductors leading off from the conductors 1, 2 and 3, the conductors 5, 6 and 7 being understood to run through some suitable transmission device or other apparatus requiring overload current protection. Each of the lines 5, 6 and 7 I show equipped with automatic overload circuit breaking apparatus involving my present invention. I show in connection with line or conductor 5, for example, the fuse 8 which is of very low carrying capacity, preferably a very small percent., for instance, one percent., of the entire carrying capacity or load carried by conductor 5.

I also show a circuit breaker 9 which may be any suitable or desirable type of automatic commercial circuit breaker preferably of the air break type. The contacts 10—10 of this circuit breaker are connected by wires 11 and 12 with the line 5 so that the fuse 8 is in shunt with the circuit breaker. The operating solenoid 14 of the circuit breaker is connected in series with the line conductor 5, this solenoid 14 acting upon tripping mechanism 15 to operate the circuit breaker when a predetermined overload traverses the conductor 5. Thus it will be seen that whenever a predetermined or sufficient overload passes in the line 5 the solenoid 14 will actuate the circuit breaker 9 and thereby open the circuit across the contacts 10—10, whereupon the entire current will be thrown upon the fuse 8, thereby operating or blowing said fuse instantaneously, the fuse having a relatively small carrying capacity. The other lines 6 and 7 I show also provided with fuses 8—8 and circuit breakers 9—9 connected and operating as described in connection with line 5. It will be seen that reliability, certainty and quickness of action are secured, the circuit breaker operating quickly when a predetermined overload is reached and then the fuse operating. Thus, with a low voltage circuit breaker of small and cheap design and a low capacity fuse of high voltage, a very rapid operating mechanism is obtained with reliability of action and low maintenance cost. It will be seen at the same time that the arcing effect is taken care of by the character of the arrangement of circuit breaker and fuse, and protection for the translating apparatus on the line is thereby insured because the circuit breaker with its tripping coil in the primary circuit is more responsive and will operate more quickly than the usual oil switch and tripping mechanism at the generating stations. This insures against such first operation of the circuit breaking mechanism at the generating station, with consequent ill effects upon the service given other loads connected to the same circuit.

When desired, the circuit breaker may be immersed in oil, although as a general rule this is not necessary because there is no little arc. With the arrangement as shown in my invention, it is easy and inexpensive to replace the fuse since it is contained in a removable cartridge.

In Fig. 2 I have shown the preferred form of apparatus which I employ. This embodies a swinging knife blade switch 16 pivoted at 17 to a post 18 secured to an upright support 19. The blade 16 has an extension 20 to which is secured a spring 21, also fastened to the support 19, said spring tending to draw said extension 20 toward the support 19. This upright support is made of insulation. Spring contact jaws 22 are also mounted upon the upright support 19 and are arranged to coöperate with the blade 16 and other contact jaws 23 also mounted on the support 19 are arranged to coöperate with the extension 20. These contacts are suitably insulated from each other. An electromagnet or solenoid 24 is shown mounted upon the support 19, being conveniently associated with the jaws 22 and is provided with an armature 25. This armature 25 is pivotally connected at its lower end to a support 26 and at its upper end constitutes a support for the links 27 and 28 which are pivotally connected to one another, by frictionally engaging the under sides of the links at their pivotal point to retain the links in the position disclosed in Fig. 2, it being understood that the link 27 is in the form of a hook or catch to engage the end of the switch blade 16. A spring 29 acts upon the catch 27 tending to hold the same in engagement with the switch blade 16. Thus, the blade 16 is normally held closed in the contact 22 by the catch 27, but when the solenoid 24 is energized and the armature 25 attracted, the catch 27 is shifted due to the action of the spring member 29 so as to disengage the blade 16, thereby permitting the spring 21 to actuate the same and separate the blade 16 from the contact 22 and cause extensions 20 to connect with the contact jaws 23, the links 27 and 28 having a loose connection with one another and with the armature 25 with sufficient loose motion to permit a slight buckling of the links 27 and 28 so as to cause a release or trip of the blade 16.

On the other side of the upright 19 are mounted a pair of posts 30 and 31 which support an inclosed fuse 32. The arrangement is so connected that the solenoid 24 is included in the circuit as shown in Fig. 1, and when the solenoid is energized by an overload current and the blade 16 released, the circuit through the blade 16 by way of contact jaws 22 is opened, and the fuse 32 is connected in shunt by the extension 20 meeting the spring jaws 23, the connection to the swinging blade 16 and extension 20 being by way of metal rods to posts 18.

Thus the operation of this arrangement is very much as the operation of the Fig. 1 apparatus, the switch or circuit breaker being first opened and then a shunt through the fuse being opened.

In Fig. 3 I have shown an arrangement very similar to that of Fig. 2, but instead of having three posts on the upright 19 I have shown in Fig. 3 only two posts, namely, the spring jaws 22 and the post 18 to which the switch blade 16[a] is pivoted. The fuse 32 is connected with the posts 30, as in Fig. 2, and also with the posts 31[a], being a rear extension of the post 18. Thus a fuse 32 is normally connected in shunt with the circuit breaker or switch instead of being thrown into shunt by the operation of the switch as in Fig. 2.

It will be understood that changes and modifications may be made without departing from the spirit of the invention.

What I claim is:

1. The combination of a circuit breaking device having a swinging knife blade, spring contact jaws therefor mounted upon an insulating support, electromagnetically controlled means tending to hold said knife blade normally in position in said contact jaws, spring means tending to open said knife blade, and a fuse mounted on the opposite side of said support and arranged for connection in shunt between the spring contact jaws for said knife blade.

2. A circuit breaking device comprising a support, contact jaws carried by a metallic post which extends through said support and has its opposite end made in the form of a fuse terminal, a swinging blade adapted to engage said contact jaws and mounted upon a post also carried by said support on the same side thereof as said contact jaws, another post mounted on the other side of said support and providing the other fuse terminal on the same side of said support as said first mentioned terminal, a magnet and a trip device controlled by the armature thereof for controlling said blade.

3. A circuit breaking device comprising a support, contact jaws carried by a metallic post which extends through said support and has its opposite end made in the form of a fuse terminal, a swinging blade adapted to engage said contact jaws and mounted upon a post also carried by said support on the same side thereof as said contact jaws, another post mounted on the other side of said support and providing the other fuse terminal on the same side of said support as said first mentioned terminal, a magnet and a trip device controlled by the armature thereof for controlling said blade, said second mentioned fuse terminal post being an extension of the post upon which said swinging blade is mounted.

4. In combination, an air break switch having means for opening the same, a fusible element of small current carrying capacity compared to the normal load of the switch, means for connecting the fusible element across the terminals of the switch when the switch is opened to receive and then break the flow of current, and a barrier of insulation between the fusible element and the switch to prevent mutual interaction between the fusible element and the switch.

5. In a device for interrupting a current flow at high voltage, a switch inherently unable to break the flow of current at full load and at the desired voltage, and a fusible element in shunt with the switch, said fusible element being of a current conducting capacity comprising only a small percentage of the current carrying capacity of the switch, being of a voltage interrupting capacity in excess of the voltage impressed upon the switch and a barrier of insulation between the fusible element and the switch for preventing the arcing at the fuse from affecting the break at the switch.

6. In combination, a switch, a fuse and means for connecting the fuse across the terminals of the switch only after the switch is opened.

7. In combination, a switch, a fuse of relatively small current carrying capacity as compared to the normal load through the switch, means controlled by the switch for connecting the fuse across the terminals of the switch only after the switch is opened to cause the fuse to receive the current flow and immediately break the same.

In witness whereof, I hereunto subscribe my name this 9th day of October, A. D. 1918.

EDMUND O. SCHWEITZER.